United States Patent
Eisch

(10) Patent No.: US 11,701,844 B2
(45) Date of Patent: Jul. 18, 2023

(54) PULLING DEVICE FOR A PULTRUSION DEVICE

(71) Applicant: Bayerische Motoren Werke Aktiengesellschaft, Munich (DE)

(72) Inventor: Christoph Eisch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 353 days.

(21) Appl. No.: 15/631,100

(22) Filed: Jun. 23, 2017

(65) Prior Publication Data

US 2017/0282468 A1   Oct. 5, 2017

Related U.S. Application Data

(63) Continuation of application No. PCT/EP2015/077587, filed on Nov. 25, 2015.

(30) Foreign Application Priority Data

Feb. 3, 2015 (DE) ...................... 10 2015 201 795.8

(51) Int. Cl.
   *B29C 70/00* (2006.01)
   *B29C 70/52* (2006.01)
   *B29C 70/54* (2006.01)

(52) U.S. Cl.
   CPC .......... *B29C 70/527* (2013.01); *B29C 70/524* (2013.01); *B29C 70/541* (2013.01)

(58) Field of Classification Search
   CPC ................................................... B29C 70/527
   See application file for complete search history.

(56) References Cited

U.S. PATENT DOCUMENTS

| 4,623,290 | A |   | 11/1986 | Kikuzawa et al. |
| 4,673,541 | A | * | 6/1987 | Watanabe ............. B29C 70/523 |
|   |   |   |   | 156/273.7 |
| 4,987,808 | A | * | 1/1991 | Sicka ..................... B26D 7/084 |
|   |   |   |   | 83/13 |
| 5,495,425 | A | * | 2/1996 | Kanaan ................. B23B 31/202 |
|   |   |   |   | 702/182 |

(Continued)

FOREIGN PATENT DOCUMENTS

| CN | 1389311 A | 1/2003 |
| DE | 24 61 706 A1 | 7/1975 |

(Continued)

OTHER PUBLICATIONS

German-language Search Report issued in counterpart German Application No. 10 2015 201 795.8 dated Aug. 26, 2015 with partial English translation (12 pages).

(Continued)

*Primary Examiner* — Alison L Hindenlang
*Assistant Examiner* — Andrés E. Behrens, Jr.
(74) *Attorney, Agent, or Firm* — Crowell & Moring LLP

(57) ABSTRACT

A pulling device is provided for a pultrusion device, having at least one clamping device that can be moved in a pultrusion direction. The clamping device is designed to frictionally seize a pultruded profiled strand to be conveyed, in order to apply a tensile force to the profiled strand. The clamping device has at least three clamping jaws that can be moved in relation to each other, for peripherally clamping the profiled strand.

8 Claims, 2 Drawing Sheets

(56) References Cited

U.S. PATENT DOCUMENTS

| | | | |
|---|---|---|---|
| 5,556,496 A | 9/1996 | Sumerak | |
| 8,066,922 B2* | 11/2011 | Jansen | B29C 70/525 |
| | | | 156/441 |
| 2002/0178774 A1* | 12/2002 | Meyer | B21D 15/04 |
| | | | 72/78 |
| 2003/0107864 A1* | 6/2003 | Mazlout | H01L 21/687 |
| | | | 361/234 |
| 2004/0234742 A1* | 11/2004 | Johnson | B29C 70/086 |
| | | | 428/292.1 |
| 2005/0248103 A1 | 11/2005 | Kramer | |
| 2011/0114253 A1 | 5/2011 | Erb et al. | |
| 2014/0117581 A1* | 5/2014 | Jansen | B29C 70/528 |
| | | | 425/375 |
| 2014/0284843 A1* | 9/2014 | Jansen | B29C 48/301 |
| | | | 264/258 |
| 2017/0232692 A1* | 8/2017 | Jansen | B29C 70/523 |
| | | | 264/169 |
| 2017/0282468 A1 | 10/2017 | Eisch | |

FOREIGN PATENT DOCUMENTS

| | | |
|---|---|---|
| DE | 34 07 230 A1 | 9/1984 |
| DE | 238 943 A1 | 9/1986 |
| DE | 198 53 525 A1 | 5/2000 |
| DE | 696 05 645 T2 | 6/2000 |
| DE | 101 26 399 A1 | 12/2002 |
| DE | 10 2005 024 840 B3 | 1/2007 |
| DE | 10 2009 053 947 A1 | 5/2011 |
| DE | 102014011943 A1 * 2/2016 ............. B29C 33/34 |
| EP | 0 347 590 A2 | 12/1989 |
| EP | 1 602 426 A1 | 12/2005 |
| JP | 2000-280321 A | 10/2000 |
| WO | WO 92/16350 | 10/1992 |
| WO | WO 00/30793 A1 | 6/2000 |

OTHER PUBLICATIONS

International Search Report (PCT/ISA/210) issued in PCT Application No. PCT/EP2015/077587 dated Mar. 22, 2016 with English translation (8 pages).

German-language Written Opinion (PCT/ISA/237) issued in PCT Application No. PCT/EP2015/077587 dated Mar. 22, 2016 (6 pages).

English translation of Chinese Office Action issued in counterpart Chinese Application No. 201580052601.X dated Sep. 30, 2018 (11 pages).

Chinese Office Action issued in Chinese counterpart application No. 201580052601.X dated Jun. 4, 2019, with English translation (Fourteen (14) pages).

* cited by examiner

PULLING DEVICE FOR A PULTRUSION DEVICE

CROSS REFERENCE TO RELATED APPLICATIONS

This application is a continuation of PCT International Application No. PCT/EP2015/077587, filed Nov. 25, 2015, which claims priority under 35 U.S.C. § 119 from German Patent Application No. 10 2015 201 795.8, filed Feb. 3, 2015, the entire disclosures of which are herein expressly incorporated by reference.

BACKGROUND AND SUMMARY OF THE INVENTION

The invention relates to a pulling device for a pultrusion device for producing profiled components, in particular fiber-reinforced plastics-material profiles, and to a pultrusion device having a respective pulling device.

A pultrusion method for the production of fiber-reinforced plastics-material profiles is known, for example, from DE 10 2009 053 947 A1. In a first step, the reinforcement fibers, for example from glass or carbon fibers, that are kept ready on wound packages are drawn off from the wound packages and, in an impregnation tool, are impregnated with a matrix, for example a resin. The impregnated fibers are pre-oriented in a pre-molding tool, in order for said impregnated fibers in a subsequent step by means of a pultrusion tool to be brought into the final profiled shape and cured. A profile thus produced with the aid of a pulling device is continuously pulled through the individual processing stations and is finally supplied to a cutting tool in order for segments of a defined length to be severed.

The pulling device comprises two caterpillars that are disposed so as to be mutually spaced apart (a so-called "caterpillar draw-off unit"), forming a conveying duct and moving in opposite conveying direction. In this way, a profile to be conveyed is conveyed by the caterpillars through the conveying duct at a continuous speed, and a sufficient tensile force for processing in the upstream processing stations is simultaneously provided.

Alternative embodiments of a pulling apparatus are known from DE 696 05 645 T2. Herein, a gripper (a so-called "clamping gripper") grips the pultruded profile in an encompassing manner and tightly holds the latter while the pulling apparatus is displaced in the pultrusion direction, thus exerting a tensile force on the profile. As soon as the pulling apparatus has reached its terminal position, the gripper has to be released and the pulling apparatus has to be displaced back to its starting position in order to grip the profile again. The profile is thus conveyed in a discontinuous manner.

According to an alternative that is likewise described, a second pulling apparatus which is displaced in the same way but is moved in a manner alternating to that of the first pulling apparatus is provided. As soon as the first pulling apparatus reaches its terminal position and releases the first gripper, a second gripper of the second pulling apparatus is closed and the profile is pulled onward by a displacement of the second pulling apparatus, while the first pulling apparatus, being uncoupled from the profile, moves back to its initial position. The second gripper is released once the second pulling apparatus reaches its terminal position, and the sequence starts again by closing the first gripper in the initial position of the first pulling apparatus and displacing the first pulling apparatus to the terminal position of the latter. The profile is imparted continuous movement by virtue of the movement in alternating cycles.

Clamping jaws are usually employed as grippers, said clamping jaws forming two clamping faces that are disposed so as to be mutually parallel, clamping the profile therebetween, so as to introduce a pulling force into the profile. The clamping force herein has to be sufficiently large in order to be able to provide a sufficient pulling force. A deformation of the profile cross section cannot be precluded when such a clamping on two sides is used in the case of the conventional methods.

In particular in the case of thin-walled hollow profiles, a required clamping force may be greater than a resilience of the profile. In these cases, a support mandrel is hitherto required in order for the profile to be supported. This generates a large additional effort which is associated with additional costs and an increased cycle time.

It is therefore an object of the invention to provide a pulling device which reduces or even prevents any deformation of the profiled strand but nevertheless enables transmission of a sufficient pulling force onto the profiled strand.

This and other objects are achieved by a pulling device and by a pultrusion device having the pulling device according to embodiments of the invention.

Accordingly, a pulling device for a pultrusion device, having at least one clamping device that is displaceable in a pultrusion direction, is provided, wherein the clamping device is designed for gripping in a force-fitting manner a pultruded profiled strand to be conveyed so as to apply a tensile force. Moreover, the clamping device for peripherally clamping the profiled strand has at least three clamping jaws that are movable in relation to one another.

The pulling device thus provides three or more clamping jaws which are movable in relation to one another and are configured for peripherally clamping the profiled strand in order for the pulling force to be introduced into the profiled strand that has been generated by means of pultrusion in the upstream processing stations of the pultrusion device.

A clamping force is peripherally distributed by the at least three clamping jaws, and clamping is thus caused from at least three or more different directions such that any undesirable deformation of the profiled strand is at least reduced. Stress on the profiled strand by clamping is uniformly distributed. The complex and cost-intensive use of support mandrels can thus be dispensed with.

The clamping jaws are preferably disposed in a common plane which is aligned so as to be perpendicular to the pultrusion direction of the pultrusion device. Clamping that is as optimal as possible can thus be achieved since the individual clamping jaws each apply a force or a counterforce, respectively, to a cross section of the profiled strand in this plane. The clamping directions of the clamping jaws are likewise preferably aligned in various directions within this plane.

According to one embodiment, the clamping jaws each have one clamping face for contacting an external contour of the profiled strand over a surface area. Thanks to the planar contact, the respective clamping force is introduced in a planar manner on the external contour of the profiled strand. Punctiform force peaks which could damage or locally deform the profiled strand are avoided in this way.

The clamping faces of the clamping jaws preferably define an internal contour of the clamping device that is designed so as to be complementary to the external contour of the profiled strand to be clamped, the former enclosing a receptacle space for the disposition of the profiled strand. This means that the clamping faces follow the profile of the external contour of the profiled strand and accordingly represent a negative mold thereto. This ensures an impingement of the profiled strand across as large an area as possible, in particular preventing any deformation of said profiled strand. The clamping faces of the clamping jaws that are configured in a complementary manner within the clamping plane are preferably disposed in an encircling manner about the profiled strand, in a clamped state enclosing the latter in a substantially complete manner. Local deformation is thus prevented since indenting and buckling of the profiled strand is not possible.

According to one embodiment, the clamping jaws are part of a collet which comprises a cone-shaped external contour and longitudinal slots for mutually separating the clamping jaws. A collect receptacle having an internal cone that is configured so as to be complementary to the cone-shaped external contour is provided for closing the collet and pressing the clamping jaws for clamping the profiled strand.

The collet, in a manner similar to that of collets for machine tools, is embodied so as to be substantially sleeve-shaped, having in the center thereof a continuous receptacle opening that in the longitudinal direction of said sleeve extends through the latter. The profiled strand is guided through this receptacle opening such that the latter must be larger than the external contour of the profiled strand. Moreover, the sleeve-shaped collet in the wall thereof has the described longitudinal slots which extend from an open end along the length of the sleeve but are not completely continuous up to an opposite second end. The wall at this second end remains configured so as to be without longitudinal slots and thus closed in the circumferential direction. Clamping jaws which (at least to a certain extent) are movable in order for the profiled strand to be clamped are formed in the region of the open end by the longitudinal slots.

In order to be activated, the collet is designed having a portion that is configured as an external cone. This external cone interacts with an internal cone of the collet receptacle in such a manner that a movement of the clamping jaws is caused in the case of a longitudinal displacement of the collet receptacle.

It is possible for the profiled strand to be clamped and rapidly released again in a simple manner by use of the collet. The collet receptacle has only to be moved accordingly in relation to the collet.

In each case, the internal contour that is defined by the clamping jaws can be designed so as to be round, oval, and/or polygonal. The internal contour is preferably adapted to a correspondingly molded external contour of the pultruded profiled strand.

In order for the advantage of clamping by way of the at least three clamping jaws to be increased, the clamping directions of the movable clamping jaws converge in a common center. This common center is particularly preferably disposed within the internal contour of the clamping jaws, that is to say in that receptacle region for the profiled strand that is defined by the clamping jaws.

According to one embodiment, the clamping jaws each are movable in a radial direction toward the common center. A clamping direction and a movement direction of the respective clamping jaw are identical in this case.

A pultrusion device having a pulling device is furthermore proposed, wherein the pulling device is configured according to the description.

The pulling device preferably comprises two clamping devices that are movable in an alternating manner in the pultrusion direction and are configured for applying a tensile force to the profiled strand in an alternating manner. This embodiment offers the possibility of conveying the profiled strand in a continuous movement in that the first clamping device is closed first, clamping the profiled strand so as to pull the latter in the pultrusion direction. The second clamping device at this point in time is opened such that the profiled strand is moved unimpeded through said second clamping device. The first clamping device is opened and the profiled strand is released only once the first clamping device has reached the terminal position of its movement. The second clamping device is correspondingly closed in order to clamp the profiled strand and to pull it in the longitudinal direction up to the terminal position of the second clamping device. The second clamping device is opened there. In the meantime, the first clamping device has been moved back to its initial position and is closed in an alternating manner once the second clamping device is opened. The sequence is repeated in a corresponding manner, by virtue of the alternating changeover allowing a continuous conveying movement of the profiled strand through the pultrusion device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
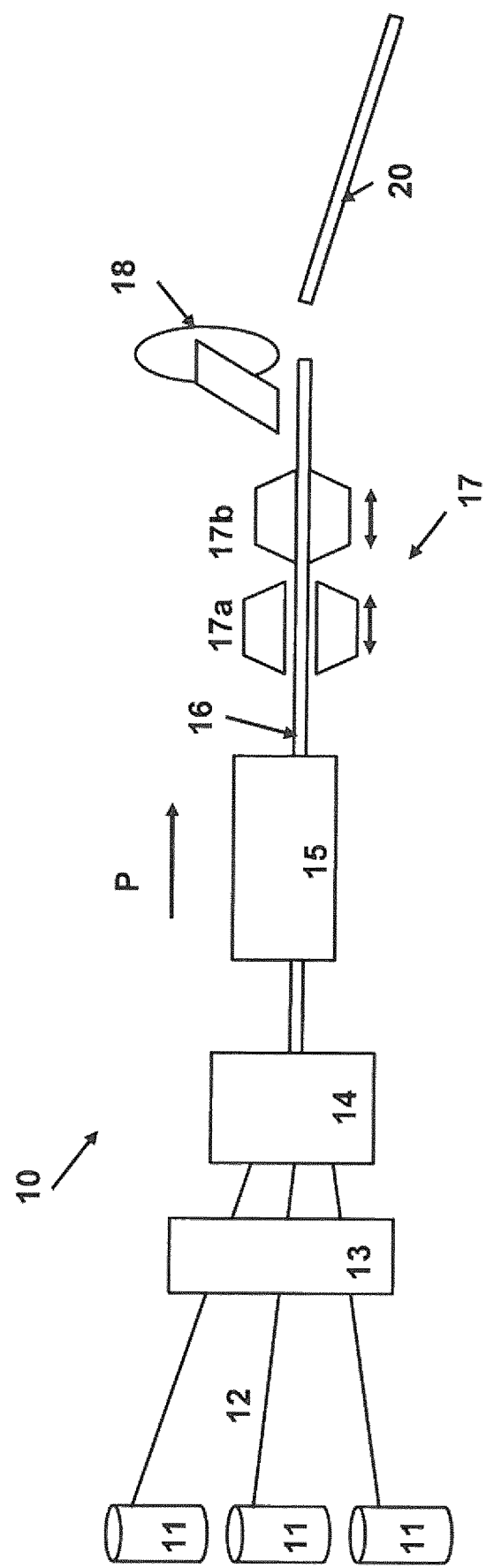
FIG. 1 is a schematic diagram of a pultrusion device according to the prior art.

A pultrusion device 10 for the production of fiber-reinforced profiled components 20 is illustrated in FIG. 1. In a first step, reinforcement fibers 12, for example from glass or carbon fibers, that are kept ready on wound packages 11 are drawn off from the wound packages 11, and in an impregnation tool 13, are impregnated with a matrix, for example a resin. The impregnated fibers 12 are pre-oriented in a pre-molding tool 14, in order for said impregnated fibers 12 in a subsequent step by use of a pultrusion tool 15 to be brought into the final profiled shape and cured. A profiled strand 16 thus produced with the aid of a pulling device 17 is continuously pulled through the individual processing stations 13, 14, 15 and is finally supplied to a cutting tool 18 in order for segments of a defined length, that is to say the profiled components 20, to be severed.

The pulling device 17 comprises two clamping devices 17a, 17b, which each in the pultrusion direction P of the pultrusion device 10 are displaceable between an initial position and a terminal position. In order for the profiled strand 16 to be continuously moved through the pultrusion device 10, the two clamping devices 17a, 17b are mutually displaced in an alternating manner.

Figure 2:
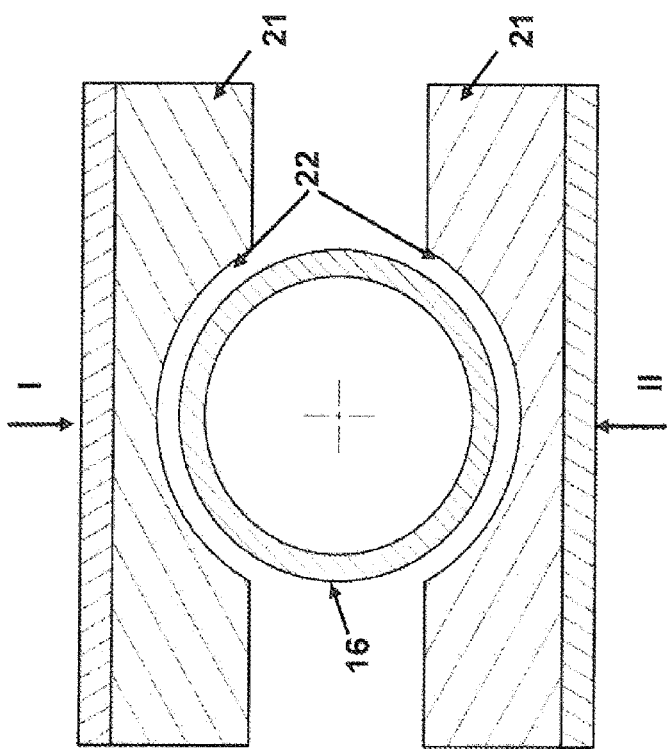
FIG. 2 is a cross-sectional view of a clamping device for a pulling device of a pultrusion device according to the prior art.

FIG. 2 shows chucking jaws 21, or clamping jaws 21, respectively, that are usually employed and are configured in pairs so as to clamp the profiled strand 16 from two opposite directions I, II, in order for a pulling force to be introduced into the profiled strand 16. The clamping jaws 21 are typically configured as flat faces, or have an internal contour 22 that is partially adapted to the profiled strand 16. By virtue of clamping on both sides, a deformation of a cross section of the profiled strand 16 can arise in that the latter yields laterally.

Figure 3:
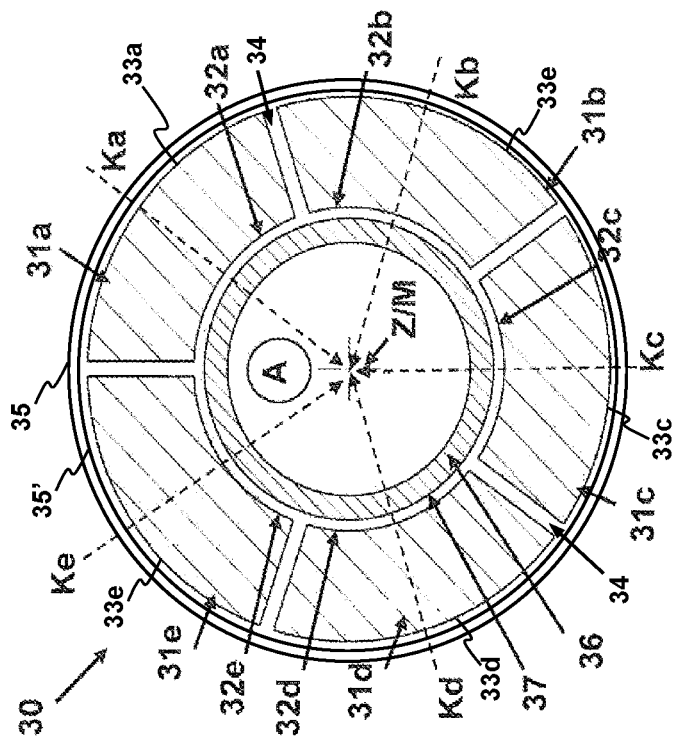
FIG. 3 is a cross-sectional view of a clamping device having a number of clamping jaws according to an embodiment of the invention.

FIG. 3 shows a clamping device 30 having a number of clamping jaws 31a-e for a pulling device of a pultrusion device (not illustrated). The clamping device 30 is designed for gripping in a force-fitting manner the pultruded profiled strand 36 so as to apply a pulling force to the profiled strand. To this end, the clamping jaws 31a-e may be part of a collet which comprises a cone-shaped external contour 33a-e and longitudinal slots 34 for mutually separating the clamping jaws 31a-e. A collet receptacle 35 having an internal cone 35' that is configured so as to be complementary to the cone-shaped external contour 33a-e may be provided for closing the collet and pressing the clamping jaws 32a-e for clamping the profiled strand 36.

The collet, in a manner similar to that of collets for machine tools, may be substantially sleeve-shaped, having in the center thereof a continuous receptacle opening 38 that in the longitudinal direction of said sleeve extends through the latter. The profiled strand 36 may be guided through this receptacle opening 38 such that the latter must be larger than the external contour 37 of the profiled strand 36. Moreover, the sleeve-shaped collet in the wall thereof has the described longitudinal slots 34 which extend from an open end along the length of the sleeve but are not completely continuous up to an opposite second end. The wall at this second end remains configured so as to be without longitudinal slots and thus closed in the circumferential direction. The clamping jaws 32a-e, which (at least to a certain extent) are movable in order for the profiled strand 36 to be clamped, are formed in the region of the open end by the longitudinal slots 38. In order to be activated, the collet is designed having a portion that is configured as an external cone 33a-e (i.e., the cone-shaped external contour). This external cone 33a-e interacts with the internal cone 35' of the collet receptacle 35 in such a manner that a movement of the clamping jaws 32a-e is caused in the case of a longitudinal displacement of the collet receptacle 35. It is therefore possible for the profiled strand 36 to be clamped and rapidly released again in a simple manner by use of the collet. The collet receptacle has only to be moved accordingly in relation to the collet.

The clamping device 30 for peripherally clamping the profiled strand 36 has, for example, five clamping jaws 31a-e that are movable in relation to one another. Each of the clamping jaws 31a-e has one clamping face 32a-e for contacting an external contour of the profiled strand 36 over a surface area (not-punctiform).

On account thereof, it is possible for the clamping faces 32a-e of the clamping jaws 31a-e to define an internal contour of the clamping device 30 that has a round cross section and that is designed so as to be complementary to an external contour 37 of the profiled strand 36 to be clamped that has a round cross section, and that encloses a receptacle space A for the disposition of the profiled strand 36. The profiled strand 36 is thus substantially completely enclosed in the circumferential direction such that a clamping force is introduced into the profiled strand 36 all around the latter, preventing lateral yielding of the profiled strand 36 in the case of an impingement with a clamping force.

Accordingly, the clamping jaws 31a-e are disposed in a circular manner such that the clamping directions of the movable clamping jaws 31a-e converge in a common center Z. In the embodiment illustrated, the common center Z is identical to the center M of the profiled strand 36. In the case illustrated, the clamping directions $K_{a-e}$ are identical to the radially directed movement directions (not separately illustrated) of the clamping jaws 31a-e such that the clamping jaws 31a-e each are movable in a radial direction toward the common center.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pulling device for a pultrusion device, comprising:
at least one clamping device configured to grip, a pultruded profiled strand of fiber-reinforced plastics-material, and displaceable in a pultrusion direction so as to pull the pultruded profiled strand gripped therein in the pultrusion direction through the pultrusion device, wherein the clamping device comprises:
a collet defining a central axis and having:
at least three clamping jaws, each clamping jaw having a clamping face and being radially displaceable towards the central axis such that each clamping face force-fit contacts a respective radial portion of a cross-sectional surface area of the pultruded profiled strand to thereby provide a gripping force that is normal to and substantially uniform over the entirety of the cross-sectional surface area, and
a collet receptacle configured to circumferentially enclose the clamping jaws such that moving the collet receptacle along the central axis relative to the clamping jaws squeezes the clamping jaws so as to cause the radial displacement of the clamping jaws for force-fitting to and thereby gripping the pultruded profiled strand.

2. The pulling device of claim 1, wherein the collet has a conical contour and longitudinal slots for radially separating the clamping jaws.

3. The pulling device of claim 2, wherein the collet receptacle has a conical interior fit complementary to the conical contour of the collet.

4. The pulling device of claim 1, wherein the clamping faces together, when radially displaced towards the central axis, define an internal contour shaped complementary to the cross-sectional surface area of the pultruded profiled strand.

5. The pulling device of claim 1, wherein the internal contour is round, oval or polygonal.

6. The pulling device of claim 1, wherein the clamping jaws are disposed in a common plane perpendicular to the pultrusion direction.

7. The pulling device of claim 1, wherein the central axis is along the pultrusion direction.

8. The pulling device of claim 1, wherein local deformation of the pultruded profiled strand is prevented by the gripping force provided via the clamping jaws.

* * * * *